United States Patent
Lundberg et al.

(10) Patent No.: US 8,706,843 B2
(45) Date of Patent: Apr. 22, 2014

(54) NETWORK CONNECTOR DEVICE

(75) Inventors: Stefan Lundberg, Lund (SE); Joacim Tullberg, Lund (SE)

(73) Assignee: Axis AB, Lund (SE)

( * ) Notice: Subject to any disclaimer, the term of this patent is extended or adjusted under 35 U.S.C. 154(b) by 422 days.

(21) Appl. No.: 12/556,075

(22) Filed: Sep. 9, 2009

(65) Prior Publication Data

US 2010/0064029 A1 Mar. 11, 2010

Related U.S. Application Data

(60) Provisional application No. 61/096,413, filed on Sep. 12, 2008.

(30) Foreign Application Priority Data

Sep. 10, 2008 (EP) ..................................... 08164051

(51) Int. Cl.
*G06F 15/16* (2006.01)

(52) U.S. Cl.
USPC ............. 709/219; 348/143; 348/61; 348/158; 348/187; 348/207.1; 348/211.3; 348/211.99; 709/230; 709/249

(58) Field of Classification Search
USPC ................. 709/220–227, 201–204, 230–232, 709/248–249, 200; 345/2.1–2.3, 5, 31–32, 345/530–560, 520, 153, 156–158, 169, 345/619; 348/14.01–14.09, 143, 147, 348/158–159, 175–178, 187–192, 207.1, 348/201.11, 208.3, 211.99, 211.1–211.11, 348/552, 714–715; 340/3.1, 3.3–3.32; 725/105–110, 114–117, 143–148
See application file for complete search history.

(56) References Cited

U.S. PATENT DOCUMENTS

| | | | | |
|---|---|---|---|---|
| 7,298,397 B2 * | 11/2007 | Cooper et al. | ............. | 348/207.1 |
| 7,373,395 B2 * | 5/2008 | Brailean et al. | ............... | 709/219 |
| 7,576,770 B2 * | 8/2009 | Metzger et al. | ............... | 348/143 |
| 7,639,943 B1 * | 12/2009 | Kalajan | ......................... | 396/429 |
| 7,760,230 B2 * | 7/2010 | Russell et al. | ................ | 348/143 |
| 7,970,859 B2 * | 6/2011 | Weinstock et al. | ........... | 709/217 |
| 2002/0149672 A1 * | 10/2002 | Clapp et al. | ................ | 348/14.09 |
| 2004/0083305 A1 | 4/2004 | Wang et al. | | |
| 2005/0068951 A1 | 3/2005 | Rivard et al. | | |

(Continued)

FOREIGN PATENT DOCUMENTS

| | | |
|---|---|---|
| EP | 0786883 A1 | 7/1997 |
| EP | 1635534 A2 | 9/2006 |

(Continued)

*Primary Examiner* — Greg C Bengzon
(74) *Attorney, Agent, or Firm* — Volpe and Koenig, P.C.

(57) ABSTRACT

A network connector device and a method for making image information sent through a first digital network accessible by a second digital network. A first and a second network connector are arranged to pass on digital network traffic, a network traffic buffer buffers the digital network traffic, an image session identifier identifies a network session from the buffered digital network traffic, containing image information. An image session tracker tracks the identified network session containing image information, an image extractor extracts image information from the identified network session containing image information, and an image information buffer buffers the extracted image information. An image information arranger arranges the image information from the image information buffer into at least one image sequence of related images, and a server makes accessible the at least one image sequence via a third network connector.

12 Claims, 2 Drawing Sheets

(56) References Cited

U.S. PATENT DOCUMENTS

| | | |
|---|---|---|
| 2006/0055790 A1 | 3/2006 | Chen et al. |
| 2006/0173997 A1 | 8/2006 | Tullberg et al. |
| 2007/0107028 A1 | 5/2007 | Monroe et al. |
| 2007/0185989 A1* | 8/2007 | Corbett et al. ............... 709/224 |
| 2007/0217501 A1* | 9/2007 | Siemens et al. ......... 375/240.01 |
| 2007/0268121 A1* | 11/2007 | Vasefi et al. ................. 340/506 |
| 2008/0106597 A1* | 5/2008 | Amini et al. .................. 348/143 |
| 2008/0122920 A1* | 5/2008 | Chang ........................ 348/14.01 |
| 2009/0027495 A1* | 1/2009 | Oskin et al. .................. 348/143 |
| 2009/0066788 A1* | 3/2009 | Baum et al. ................... 348/143 |
| 2009/0074184 A1* | 3/2009 | Baum et al. ................... 380/205 |
| 2009/0079823 A1* | 3/2009 | Bellamy et al. .............. 348/143 |
| 2009/0189981 A1* | 7/2009 | Siann et al. ................... 348/143 |
| 2010/0013918 A1* | 1/2010 | Ta'Eed ........................ 348/143 |
| 2011/0096168 A1* | 4/2011 | Siann et al. ................... 348/158 |

FOREIGN PATENT DOCUMENTS

| | | |
|---|---|---|
| EP | 1876828 A1 | 1/2008 |
| GB | 2389736 A | 12/2003 |
| WO | 0068811 A1 | 11/2000 |
| WO | 2006060923 A1 | 6/2006 |

* cited by examiner

NETWORK CONNECTOR DEVICE

CROSS REFERENCE TO RELATED APPLICATIONS

This application claims the benefit of U.S. provisional application No. 61/096,413 filed on Sep. 12, 2008 and EPC application no. 08164051.8 filed on Sep. 10, 2008, which are incorporated by reference as if fully set forth.

TECHNICAL FIELD OF THE INVENTION

The present invention relates to a network connector device for making image information sent through a first digital network accessible by a second digital network. The present invention also relates to a method for making image information sent through a first digital network accessible by a second digital network.

BACKGROUND OF THE INVENTION

Network enabled digital video cameras are today used in various applications. They may for instance be used in applications such as security surveillance and remote monitoring.

In order to allow preview of the view from a network enabled digital video camera it is generally provided with an analog output for connecting a display for preview. This enables a simple and robust way of viewing the video from the camera on site during installation for checking camera settings, e.g. field of view and focus. The analog connector enables the video signal to be transmitted into a video preview device via e.g. a coaxial cable, without the need of any additional devices.

However, for a modern digital network camera with internal image compression, image processing and Ethernet compatibility there is no other need for an analog video output connector than for enabling preview of the captured video at the camera site and using an analog display. In fact cameras of today are becoming smaller and smaller and thereby limiting the number of ports that the camera may carry. Thus, additional connectors result in bulky designs and non-discrete installations. Another problem is that with increasing number of connectors the camera become more vulnerable to water, it is hard to make the connectors water resistant.

To solve this problem the preview of the view from a network enabled digital video camera can be provided by means of a video preview device, communicating with the camera over the network. However, such arrangement requires a network socket close to the camera installation site in order to view the video from the camera on the video preview device during installation.

Thus a problem of today is the lack of simple tools for adjusting e.g. field of view and focus during installation of the camera.

SUMMARY OF THE INVENTION

One object of the present invention is to facilitate installation and services of networked cameras. Another object of the present invention is to provide a tool for checking if the communication between a digital enabled network camera and a camera viewing client is working or not.

The above object is achieved by means of a network connector device according to independent claim 1 and a method according to independent claim 9. Further embodiments of the invention are presented in the dependent claims.

In particular, according to one aspect of the invention, a network connector device comprises a first and a second network connector arranged to pass on digital network traffic, a network traffic buffer arranged to buffer said digital network traffic. The network connector device is characterized by an image session identifier arranged to identify a network session, from the buffered digital network traffic, containing image information, an image session tracker arranged to track said identified network session containing image information, an image extractor arranged to extract image information from the identified network session containing image information, an image information buffer arranged to buffer the extracted image information, an image information arranger arranged to arrange the image information from the image information buffer into at least one image sequence of related images, and a server arranged to make said at least one image sequence accessible via a third network connector.

One advantage of the network connector device is that it makes it possible to view images and/or image sequences sent by a network enabled digital network camera by means of various camera viewing clients and at a location close to a camera while the camera is communicating with camera viewing clients of the system including the networked camera. Thus, the effect of adjustments, e.g. change in filed of view or change in focus of a network enabled digital video camera, being worked on can be viewed at a location close to a camera without disconnecting the camera from the rest of the network. Further, the network connector device makes it possible to check the network communication between the network enabled digital camera and the camera viewing clients. The network connector device can be placed at a node of the network intercepting network traffic from more than one camera. Another advantage is that no additional network sockets are needed at the location of the network enabled digital network camera for use during service and/or installation of the network enabled camera.

In one embodiment, the network connector device may comprise a session buffer arranged to buffer said identified network session containing image information outputted from the image session tracker.

In another embodiment, the network connector device may comprise a protocol selector arranged to select, from the buffered digital network traffic, specific digital network traffic sent via at least one predefined protocol. By selecting, from the buffered network traffic, specific digital network traffic sent via a predefined protocol, only the specific digital network traffic sent via said at least one predefined protocol will be further processed in the network connector device. Thus, digital network traffic not sent via the predefined protocol will be disregarded and not being processed by the image session identifier. Thus, processor power of the network connector device may be saved. The predefined protocol may be TCP or UDP. It is recognized that the protocol selector may be arranged to select specific digital network traffic sent via more than one protocol at the same time. For example, it is, at the same time, possible to select specific digital network traffic sent via TCP, select specific digital network traffic sent via UDP and disregard all digital network traffic sent via FTP.

In another embodiment, the network connector device may comprise a network traffic recreator arranged to reorder the network traffic into its original form. In the reordering process the packets are arranged in correct order, i.e., first packet first, second packet next, etc. Thus, the original communication is recreated.

In yet another embodiment, the network connector device may further comprise a transcoder arranged to transcode still images into a video sequence or to transcode a video sequence into still images. The choice between converting into still images or converting into video sequences is depending on the original format buffered in the image buffer and what format is requested from the device connected to the third network connector. If the device connected to the third network connector requests still images all video sequences are transcoded into still images, and accordingly, if the device connected to the third network connector requests video sequences the still images are transcoded into video sequences.

According to another aspect of the invention, a method for making images sent through a first digital network accessible by a second digital network comprises: receiving network traffic at a first network connector, transmitting network traffic corresponding to the received network traffic from a second network connector, and buffering the received digital network traffic in a network traffic buffer. The method is characterized by: identifying a network session, from the buffered digital network traffic, containing image information, tracking said identified network session containing image information, extracting image information from the tracked network session containing image information, buffering said extracted image information in an image information buffer, arranging said image information into at least one image sequence of related images, and make said at least one image sequence accessible via a third network connector by means of a server.

According to one embodiment, the method may further comprise: buffering said identified network session.

According to yet another embodiment, the method may further comprise: selecting, from the buffered digital network traffic, specific digital network traffic sent via at least one predefined protocol.

According to another embodiment, the method may further comprise recreating buffered network traffic into its original form.

According to another embodiment, the method may further comprise transcoding still images into a video sequence.

According to another embodiment, the method may further comprise transcoding a video sequence into still images.

According to yet another embodiment, the method may further comprise packeting the at least one image sequence of related images into network packets.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in more detail by way of examples with reference to the appended schematic drawings, which shows presently preferred embodiments of the invention.

DETAILED DESCRIPTION OF PREFERRED EMBODIMENTS

Figure 1:
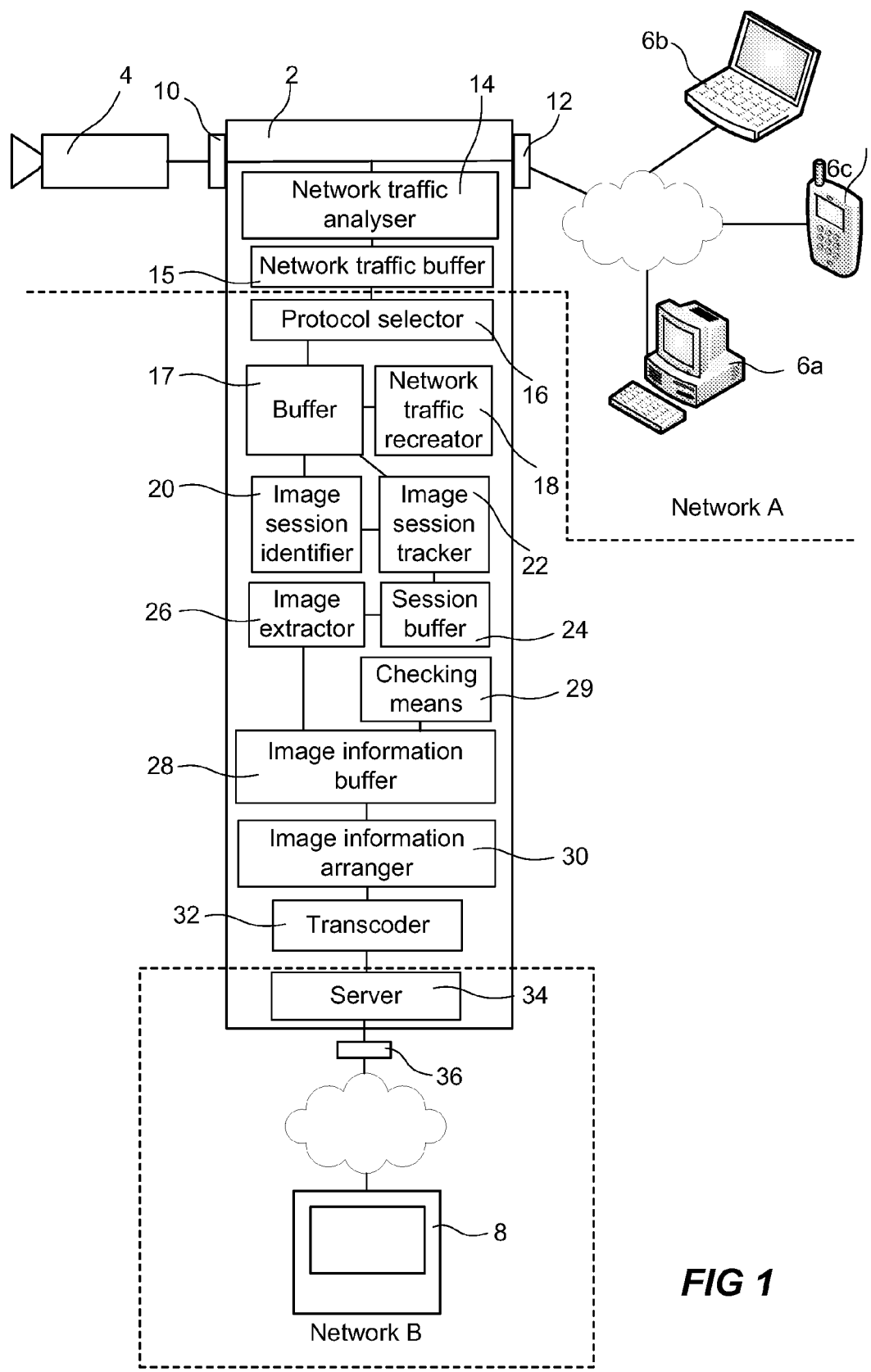
FIG. 1 shows an embodiment of a network connector device according to the present invention connected to a network enabled digital video camera, three camera viewing clients and an analyzing tool.

FIG. 1 illustrates a network connector device 2 according to one embodiment of the invention. The network connector device 2 is connecting at least one network enabled digital video camera 4 to various camera viewing clients 6a-c over a first digital network A. In FIG. 1, one network enabled digital video camera 4 is illustrated. However, it should be noted that more than one network enabled digital video camera 4 can be connected to the network connector device 2 simultaneously. The camera viewing clients 6a-6c are used to view the images sent from the network enabled digital video camera 4. The camera viewing clients 6a-6c can be any type of client being able to communicate over a digital network and being able to display images from the network enabled digital video camera 4, such as a work station, a desktop computer, a stationary personal computer, a laptop, a cellular phone, a PDA or the like. The digital network A may include wireless and/or wired communication channels. The digital network A may be any type of digital network such as Internet, a LAN (Local Area Network), a WAN, (Wide Area Network) or the like.

An analyzing tool 8 is also connected to the network connector device 2 via a second digital network B. The analyzing tool 8 may be used during installation and/or service of the network enabled digital video camera 4 for checking camera settings, e.g., field of view and focus or for checking the communication between the network enabled digital video camera 4 and the camera viewing clients 6a-6c. The analyzing tool 8 may be any type of analyzing tool 8 being able to communicate in the second digital network B and being able to display images. For example, the analyzing tool 8 may be a stationary personal computer a laptop, a cellular phone, a PDA or the like being enabled for network communication over a network like the second digital network B. The digital network B may include wireless and/or wired communication channels. The digital network B may be any type of digital network such as Internet, a LAN (Local Area Network), a WAN, (Wide Area Network) or the like.

The network connector device 2 comprises a first and a second network connector 10, 12 and a network traffic analyzer 14. The digital network traffic of the first digital network A contains packets. The digital network packets may be sent via various protocols. The used protocol may for example be UDP or TCP. The network traffic analyzer 14 may extract information, if available, about the transmitter, receiver and type of packets, e.g., from the headers of the packets. All packets are received, via the first or second network connector 10, 12, and then transmitted, via the first or second network connector 10, 12, to the intended receiver independently of the direction of the network traffic. The network traffic analyzer 14 is passing on, listening to and copying network traffic of the first digital network A. The network traffic analyzer 14 may be arranged to process packets from "reliable" services, e.g., TCP, and/or it may be arranged to process packets from "unreliable" services, e.g., UDP. The packets from "unreliable" services are often referred to as datagram. A "reliable" service is often referred to as a service arranged to notify the user if delivery of packets fails, while an "unreliable" service is not arranged to notify the user if delivery of packets/datagrams fails.

According to one embodiment, the network connector device 2 comprises a network traffic buffer 15, a protocol selector 16, a buffer 17, a network traffic recreator 18, an image session identifier 20, an image session tracker 22, a session buffer 24 and an image extractor 26.

The digital network traffic is buffered in the network traffic buffer 15. Digital network traffic, communicated via the first digital network A, belonging to a specific communication session between a network enabled digital camera 4 and one of the camera viewing clients 6a-c is buffered separately.

Among the buffered digital network traffic, specific digital network traffic sent via at least one predefined protocol may be selected by means of the protocol selector 16. The predefined protocol may be, for example, TCP or UDP. Thus, the protocol selector 16 is arranged to select digital network traffic sent via at least one predefined protocol. By selecting from the buffered network traffic, specific digital network traffic sent via at least one predefined protocol, only the digital network traffic sent via the at least one predefined protocol will be further processed in the network connector device 2. Thus, digital network traffic not sent via the at least one predefined protocol will be disregarded and not being processed by the network traffic recreator 18 or the image session identifier 20. Thus, processor power of the network connector device 2 may be saved. It is recognized that the protocol selector may be arranged to select specific digital network traffic sent via more than one protocol at the same time. For example, it is, at the same time, possible to select specific digital network traffic sent via TCP, select specific digital network traffic sent via UDP and disregard all digital network traffic sent via FTP.

The selected digital network traffic sent via the predefined protocol is stored in the buffer 17. The packets in the buffer 17 need to be in the right order in order for the digital network traffic to be further processed by the network connector device 2. If the packets arrive out of order a reordering process starts. This is performed by means of the network traffic recreator 18. Thus, the communication sessions are recreated. The recreated communication sessions may contain both the actual communication and information about the communication (sender, receiver etc.). The reordering process is performed according to standard procedures, known to the skilled man. In the reordering process the packets are arranged in correct order, i.e., first packet first, second packet next, etc.

Among the recreated communication sessions, sessions containing image information are identified by means of the image session identifier 20. This may be done, for example, by checking if the communication session is a communication session between a camera and a client. The image information may represent any type of still images or video sequences, e.g., JPEG, M-JPEG or MPEG. The image information may also comprise data about the type of image, the order of the image in an image sequence, the image size, the receiver of the image, the transmitter of the image, etc.

The identified sessions containing image information are tracked by means of the image session tracker 22. This may be achieved, for example, by matching IP-addresses and ports in the headers of each packet to the ones identifying the session.

The image session identifier 20 and image session tracker 22 may also be configured to identify and track sessions containing other type of data such as alarm data.

In the case of the predefined protocol selected by means of the protocol selector 16 being TCP the image session tracker may be performed using a "follow TCP stream" procedure.

The digital network traffic belonging to an identified and tracked session is stored in the session buffer 24.

The Image information is extracted, from the digital network traffic stored in the session buffer 24, by means of the image extractor 26. The extraction process is performed according to standard procedures, known to the skilled man.

The network connector device 2 further comprises an image information buffer 28. The image information extracted by means of the image extractor 26 is buffered in the image information buffer 28. The image information buffer 28 may be a FIFO-buffer.

Images included in the image information, communicated via the first digital network A, belonging to a specific communication session between a network enabled digital camera 4 and one of the camera viewing clients 6a-c is buffered, in the image information buffer 28, as being related to each other. Thus, every specific communication session between a network enabled digital camera 4 and one of the camera viewing clients 6a-c communicated via the first digital network A is handled separately.

The network connector device 2 further comprises an image information arranger 30. The image information arranger 30 is arranged to arrange image information from the image information buffer 28 into image sequences of related images. Related images are, according to above, images, communicated via the first digital network A, belonging to a specific communication session between a network enabled digital camera 4 and one of the camera viewing clients 6a-c. Each image sequence of related images arranged in the image information arranger 30 may contain every image belonging to a specific communication between a network enabled digital camera 4 and one of the camera viewing clients 6a-c as being related in the image buffer 28, every second image belonging to a specific communication between a network enabled digital camera 4 and one of the camera viewing clients 6a-c as being related in the image buffer 28 etc. The choice of every image making up the image sequence, every second image making up the image sequence etc. may be controlled by the analyzing tool 8.

The network connector device 2 may comprise a means 29 checking the images in the image information buffer 28. The checking means 29 may delete obsolete images buffered in the image information buffer 28. In the context of the present invention delete may mean: actually removing the image, indicating that the space occupied by the image may be overwritten, indicating that the image is not supposed to be used any more, etc. Obsolete images can for example be old images not used or images from an image sequence of related images that are not prioritized, e.g., image sequences not viewed on the analyzing tool 8. When deleting obsolete images, it is the oldest image at that point of time that shall be deleted (first in first out). An exception is when the image arranger 30 has allocated an image but the image has not been forwarded to the image arranger 30, then the oldest image not allocated by the image arranger 30 will be deleted.

An image sequence selected by means of the analyzing tool 8 and including related images originating from a specific communication session between a network enabled digital camera 4 and one of the camera viewing clients 6a-c are thereafter being provided via a third network connector 36 to the analyzing tool 8 by means of a server 34 arranged to send digital network traffic via the second digital network B. The server 34 may be a web server. The server 34 is packeting each image sequence into network packets before sending them via the third network connector 36 and over the second digital network B. The server 34 and the analyzing tool 8 communicate via an interface, like for example VAPIX, or by using regular HTTP.

The server 34 may deliver an index page to the analyzing tool 8 with a list of available sessions of image sequences originating from each specific communication session between a network enabled digital camera 4 and one of the camera viewing clients 6a-c. Thus, an index page regarding what image sequences that are available at the image arranger 30 is available at the analyzing tool 8. The index page may then be used to choose what image sequence or sequences to be viewed on the analyzing tool 8.

The image information arranger 30 may be active all the time or may be activated by the server 34. The server 34 may be preset to activate the image information arranger 30 or the server 34 may get information from for example the analyzing tool 8 to activate the image information arranger 30. Further, when active, the image arranger 30 may also allocate the sequence of images that are of interest for the analyzing tool 8 so that these images are not deleted from the image information buffer 28 during the checking of and deleting of obsolete images.

The image sequences sent by the server 34 arriving at the analyzing tool 8 can either be viewed live or be stored.

The analyzing tool 8 may be arranged to receive a plurality of simultaneous image sequences. These image sequences may then be viewed at the same time. For example, if the analyzing tool 8 requests two simultaneous image sequences both may be viewed at the same time.

The network connector device 2 may further comprise a transcoder 32. The transcoder 32 may transcode the image sequence of related images from still images into a video sequence. The transcoder 32 may transcode the image sequence of related images from a video sequence into still images. The choice between converting into still images or converting into a video sequence is depending on the original format buffered in the image information buffer 28 and what format is requested from the analyzing tool 8. For example if the analyzing tool 8 requests still images all video sequences are transcoded into still images, and accordingly, if the analyzing tool 8 requests video sequences the still images are transcoded into video sequences.

The communication between the network connector device 2 and the analyzing tool 8 via the second network B has nothing to do with the communication in the first digital network A except that the image information communicated over network B are a copy of the image information in the network traffic of the digital network A.

The network connector device 2 is receiving and passing on digital network traffic on the digital network A, without altering the network traffic at all or at least with substantially no altering of the network traffic, at the same time as it is delivering a copy of selected network traffic (traffic containing image information) from the first digital network A to the second digital network B. Thus, it becomes possible to see the effect of adjustments at a location close to a network enabled digital video camera 4 being worked on, e.g., a change in focus, an adjustment of the field of view, etc., without having the network enabled digital video camera 4 disconnected from the rest of the network. The network connector device 2 may be used in a way such that the analyzing tool 8 may be able to communicate with the server 34 over network B using one IP-address and another IP-address for communication with the network enabled digital video camera 4 over network A. The network connector device 2 is in this sense functioning as a bridge or a NAT that facilitates parallel communication in the two networks A, B.

Figure 2:
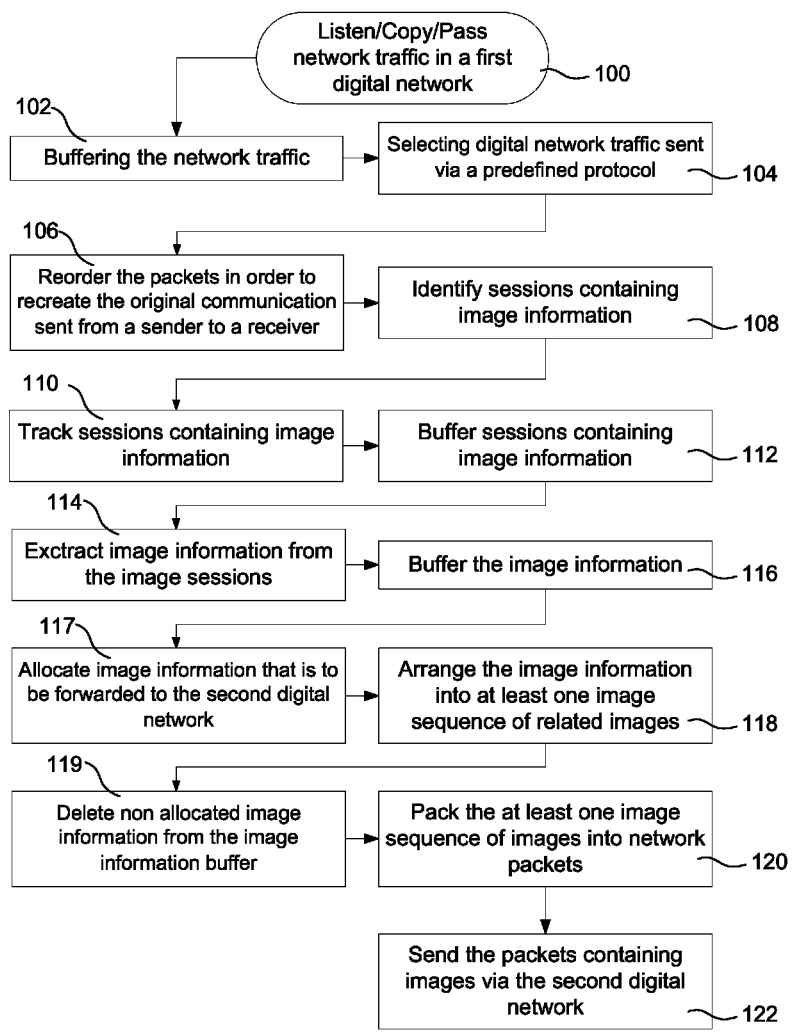
FIG. 2 is a schematic flowchart of the process making image information sent through a first digital network accessible by a second digital network according to one embodiment of the invention.

Now referring to FIG. 2, describing the preferred method for making images sent through the first digital network A accessible by the second digital network B. We presume that at least one network enabled digital video camera 4 is connected to various camera viewing clients 6a-c via the first digital network A. The connection between the at least one network enabled digital video camera 4 and the camera viewing clients 6a-c is done via the first and the second network connector 10, 12 of the network connector device 2. Further, we presume that the analyzing tool 8 is connected to the third network connector 36 of the network connector device 2 via the second digital network B.

Let us assume that digital network traffic containing image information is sent from the network enabled digital video camera 4 to the camera viewing client 6a-c over the digital network A. The network traffic is sent as packets. The image information of the network traffic of the first digital network A is then provided to the analyzing tool 8 via the second digital network B according to the following:

The digital network traffic is listened to, passed on and copied in the network traffic analyzer 14 in the network connector device 2, step 100. The digital network traffic is buffered in the network traffic buffer 15, step 102. The buffered network traffic may be a copy of the network traffic passing the network traffic analyzer 14.

The buffered network traffic is analyzed in the protocol selector 16 selecting specific digital network traffic sent via at least one predefined protocol, step 104. Thus, only specific digital network traffic sent via at least one predefined protocol is passed on by the protocol selector 16. Such a selected protocol may be TCP or UDP. The type of selected protocol may be set in the protocol selector 16.

The selected digital network traffic is stored in the buffer 17. The stored packets are reordered in order to recreate the original communication sent from a sender to a receiver, step 106. Thus, the packets are reordered so that the first packet is first, second packet is next, etc.

From the buffered digital network traffic, network sessions containing image information are identified by means of the image session identifier 20, step 108.

The identified network sessions containing image information are thereafter tracked by means of the image session tracker 22, step 110.

The sessions containing image information identified and tracked in steps 108 and 110 are buffered in the session buffer, step 112.

Image information is extracted from the tracked image sessions, step 114. The image information is extracted from the tracked image sessions by means of an image extractor 26. The extracted image information from step 114 is then buffered in the image information buffer 28, step 116. Image information, communicated via the first digital network A, belonging to a specific communication session between a network enabled digital camera 4 and one of the camera viewing clients 6a-c is buffered as a specific sequence of images in the image information buffer 28. Next, image information buffered in the image information buffer (28) that is to be forwarded to the second digital network (B) is allocated, step 117.

The allocated image information is then arranged into at least one image sequence of related images, step 118. Related images are images, communicated via the first digital network A, belonging to a specific communication session between a network enabled digital camera 4 and one of the camera viewing clients 6a-c. Image information that does not include allocated image information, obsolete image information, may be deleted from the image information buffer (28), step 119. Each arranged image sequence of related images may contain every image belonging to a specific communication session between a network enabled digital camera 4 and one of the camera viewing clients 6a-c as being related in the image information buffer 28, every second image belonging to a specific communication session between a network enabled digital camera 4 and one of the camera viewing clients 6a-c as being related in the image information buffer 28, etc.

The at least one image sequence of related images are thereafter packed into network packets, step 120. The packets are generated in a server 34. The server 34 may be a web server.

The packets from step 120 are then sent via the digital network B, step 122, to the analyzing tool 8. The server and the analyzing tool communicate via an interface, like for example VAPIX, or by using regular HTTP.

The invention claimed is:

1. A method for use in a network connector device for previewing images from a network enabled digital video camera, the method comprising:
   receiving digital network traffic from the network enabled digital video camera via a first network connector;
   sending the received digital network traffic to a first digital network via a second network connector, wherein the digital network traffic is substantially unaltered;
   receiving a copy of digital network traffic containing image information from the first digital network; and
   sending the copy of digital network traffic to a second digital network via a third network connector while sending the digital network traffic to the first digital network via the second network connector;
   wherein sending the copy of digital network traffic to the second digital network includes:
      buffering the received copy of digital network traffic in a network traffic buffer;
      selecting, from the buffered digital network traffic, specific digital network traffic sent via at least one predefined protocol;
      identifying a network session, from the buffered digital network traffic, containing image information;
      tracking the identified network session containing image information;
      extracting image information from the tracked network session containing image information;
      buffering the extracted image information in an image information buffer;
      allocating image information buffered in the image information buffer;
      arranging the allocated image information into at least one image sequence of related images, wherein each image sequence of related images is a sequence of images belonging to a communication session between the network enabled digital camera and a camera viewing client accessing the first digital network;
      deleting non-allocated image information from the image information buffer; and
      sending the at least one image sequence of related images over the second digital network via the third network connector using a server.

2. The method according to claim 1 wherein the sending the copy of digital network traffic to the second digital network further includes buffering the identified network session.

3. The method according to claim 1 wherein the sending the copy of digital network traffic to the second digital network further includes recreating buffered network traffic into its original form.

4. The method according to claim 1 wherein the sending the copy of digital network traffic to the second digital network further includes transcoding the image sequence of related images from still images into a video sequence.

5. The method according to claim 1 wherein the sending the copy of digital network traffic to the second digital network further includes transcoding the image sequence of related images from a video sequence into still images.

6. The method according to claim 1 wherein the sending the copy of digital network traffic to the second digital network further includes packeting the at least one image sequence of related images into network packets.

7. A network connector device for previewing images from a network enabled digital video camera comprising:
   a first network connector configured to receive digital network traffic from the network enabled digital video camera;
   a second network connector configured to send the received digital network traffic to a first digital network, wherein the digital network traffic is substantially unaltered;
   the second network connector further configured to receive a copy of digital network traffic containing image information from the first digital network while digital network traffic is sent to the first digital network;
   a network traffic buffer configured to buffer a copy of the digital network traffic from the network enabled digital video camera while the digital network traffic is sent to the first digital network;
   a protocol selector configured to select, from the buffered digital network traffic, specific digital network traffic sent via at least one predefined protocol;
   an image session identifier configured to identify a network session, from the buffered digital network traffic, containing image information;
   an image session tracker configured to track the identified network session containing image information;
   an image extractor configured to extract image information from the tracked network session containing image information;
   an image information buffer configured to buffer the extracted image information;
   an image information arranger configured to allocate image information buffered in the image information buffer and arrange the allocated image information into at least one image sequence of related images, wherein each image sequence of related images is a sequence of images belonging to a communication session between the network enabled digital camera and a camera viewing client accessing the first digital network;
   a checking means configured to delete non-allocated image information from the image information buffer; and
   a server configured to, via a third network connector, send the at least one image sequence of related images over a second digital network.

8. The network connector device according to claim 7 further comprises a session buffer configured to buffer the identified network session.

9. The network connector device according to claim 7 further comprises a network traffic recreator configured to recreate buffered network traffic into its original form.

10. The network connector device according to claim 7 further comprises a transcoder configured to transcode the image sequence of related images from still images into a video sequence.

11. The network connector device according to claim 7 further comprises a transcoder configured to transcode the image sequence of related images from a video sequence into still images.

12. The network connector device according to claim 7 wherein the server is further configured to arrange the at least one image sequence of related images into network packets.

\* \* \* \* \*